US010877634B1

(12) United States Patent
Sica et al.

(10) Patent No.: US 10,877,634 B1
(45) Date of Patent: Dec. 29, 2020

(54) COMPUTER ARCHITECTURE FOR RESOURCE ALLOCATION FOR COURSE OF ACTION ACTIVITIES

(71) Applicant: Raytheon Company, Waltham, MA (US)

(72) Inventors: Michael P. Sica, Oak Hill, VA (US); Jennifer N. Coston, Ashburn, VA (US); Michael C. Xu, Reston, VA (US); Kyle V. Dumouchelle, Ashburn, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/592,528

(22) Filed: Oct. 3, 2019

(51) Int. Cl.

| | |
|---|---|
| G06F 3/048 | (2013.01) |
| G06F 3/0482 | (2013.01) |
| G06F 3/0481 | (2013.01) |
| G05D 1/12 | (2006.01) |
| G05D 1/10 | (2006.01) |
| G05D 1/00 | (2006.01) |
| G06K 9/00 | (2006.01) |
| B64C 39/02 | (2006.01) |
| G06N 3/08 | (2006.01) |
| G06F 16/587 | (2019.01) |

(52) U.S. Cl.
CPC .......... *G06F 3/0482* (2013.01); *B64C 39/024* (2013.01); *G05D 1/0094* (2013.01); *G05D 1/10* (2013.01); *G05D 1/12* (2013.01); *G06F 3/04815* (2013.01); *G06F 16/587* (2019.01); *G06K 9/00771* (2013.01); *G06N 3/08* (2013.01); *B64C 2201/126* (2013.01); *G05D 2201/0209* (2013.01); *G06K 2209/21* (2013.01)

(58) Field of Classification Search
None
See application file for complete search history.

(56) References Cited

U.S. PATENT DOCUMENTS

| | | | | |
|---|---|---|---|---|
| 7,440,906 | B1 * | 10/2008 | Wetzer | G06Q 10/0631 |
| | | | | 705/7.12 |
| 9,990,178 | B2 * | 6/2018 | Fox | G06Q 10/00 |
| 10,281,281 | B2 * | 5/2019 | Ward | G06F 3/147 |
| 2003/0225707 | A1 * | 12/2003 | Ehrman | G06Q 10/08 |
| | | | | 705/64 |
| 2004/0117046 | A1 * | 6/2004 | Colle | G06Q 10/109 |
| | | | | 700/99 |
| 2004/0158568 | A1 * | 8/2004 | Colle | G06Q 10/06 |

(Continued)

OTHER PUBLICATIONS

"Vehicle routing problem", Wikipedia [Online]. Retrieved from the Internet: <URL: https://en.wikipedia.org/wiki/Vehicle_routing_problem>, 4 pgs.

(Continued)

*Primary Examiner* — Hua Lu
(74) *Attorney, Agent, or Firm* — Schwegman Lundberg & Woessner, P.A.

(57) ABSTRACT

A computing machine receives an input comprising: a representation of one or more tasks and a representation of one or more assets. The computing machine initiates generation of a mission plan data structure comprising an assignment of an available asset to each task. Upon successfully generating the mission plan data structure, the computing machine provides an output comprising the mission plan data structure.

19 Claims, 8 Drawing Sheets

(56) References Cited

U.S. PATENT DOCUMENTS

| | | | |
|---|---|---|---|
| 2006/0184292 A1* | 8/2006 | Appleby | F41H 13/00 701/23 |
| 2008/0201183 A1* | 8/2008 | Jha | G06Q 10/063 701/120 |
| 2009/0112645 A1* | 4/2009 | Jha | G06Q 10/04 705/7.12 |
| 2010/0015579 A1* | 1/2010 | Schlabach | G06N 5/04 434/11 |
| 2010/0312388 A1* | 12/2010 | Jang | G06Q 10/0631 700/248 |
| 2011/0082717 A1* | 4/2011 | Saad | G06Q 50/30 705/7.13 |
| 2011/0231364 A1* | 9/2011 | Hashimoto | G06F 21/33 707/620 |
| 2012/0209652 A1* | 8/2012 | Khosla | G06Q 10/0631 705/7.16 |
| 2013/0054056 A1* | 2/2013 | King | G06Q 10/0635 701/14 |
| 2013/0144679 A1* | 6/2013 | Burnett | G06Q 10/06313 705/7.27 |
| 2013/0158848 A1* | 6/2013 | Gallagher | F02D 19/081 701/123 |
| 2014/0052293 A1* | 2/2014 | Bruemmer | G01C 21/00 700/248 |
| 2014/0343765 A1* | 11/2014 | Suiter | G08G 5/0021 701/18 |
| 2015/0046363 A1* | 2/2015 | McNamara | G06Q 10/0635 705/333 |
| 2015/0242782 A1* | 8/2015 | Onions | G06Q 10/06313 705/7.23 |
| 2015/0269770 A1* | 9/2015 | Jenkins | G06T 15/20 345/421 |
| 2016/0247100 A1* | 8/2016 | Balestrieri | G06Q 10/0631 |
| 2017/0091688 A1* | 3/2017 | Lopes | G06Q 10/0635 |
| 2020/0090532 A1* | 3/2020 | H Kansson | G08G 5/003 |

OTHER PUBLICATIONS

Bellingham, John, "Chapter 1—Multi-Task Allocation and Path Planning for Cooperating UAVs", Cooperative Control: Models, Applications and Algorithms, (Nov. 2001), 1-19.

Talbi, El-Ghazali, "Chapter 1—Common Concepts for Metaheuristics, Section 1.3.2—Approximate Algorithms", Metaheuristics: From Design to Implementation, John Wiley & Sons Inc., (2009), 21.

* cited by examiner

US 10,877,634 B1

COMPUTER ARCHITECTURE FOR RESOURCE ALLOCATION FOR COURSE OF ACTION ACTIVITIES

TECHNICAL FIELD

Embodiments pertain to computer architecture. Some embodiments relate to resource allocation and mission planning. Some embodiments relate to a computer architecture for resource allocation for course of action (COA) activities.

BACKGROUND

Computing an efficient allocation of resources, for example in a military mission plan, may be challenging. Computer-implemented approaches for efficient resource allocation may be desirable.

SUMMARY

Figure 1:
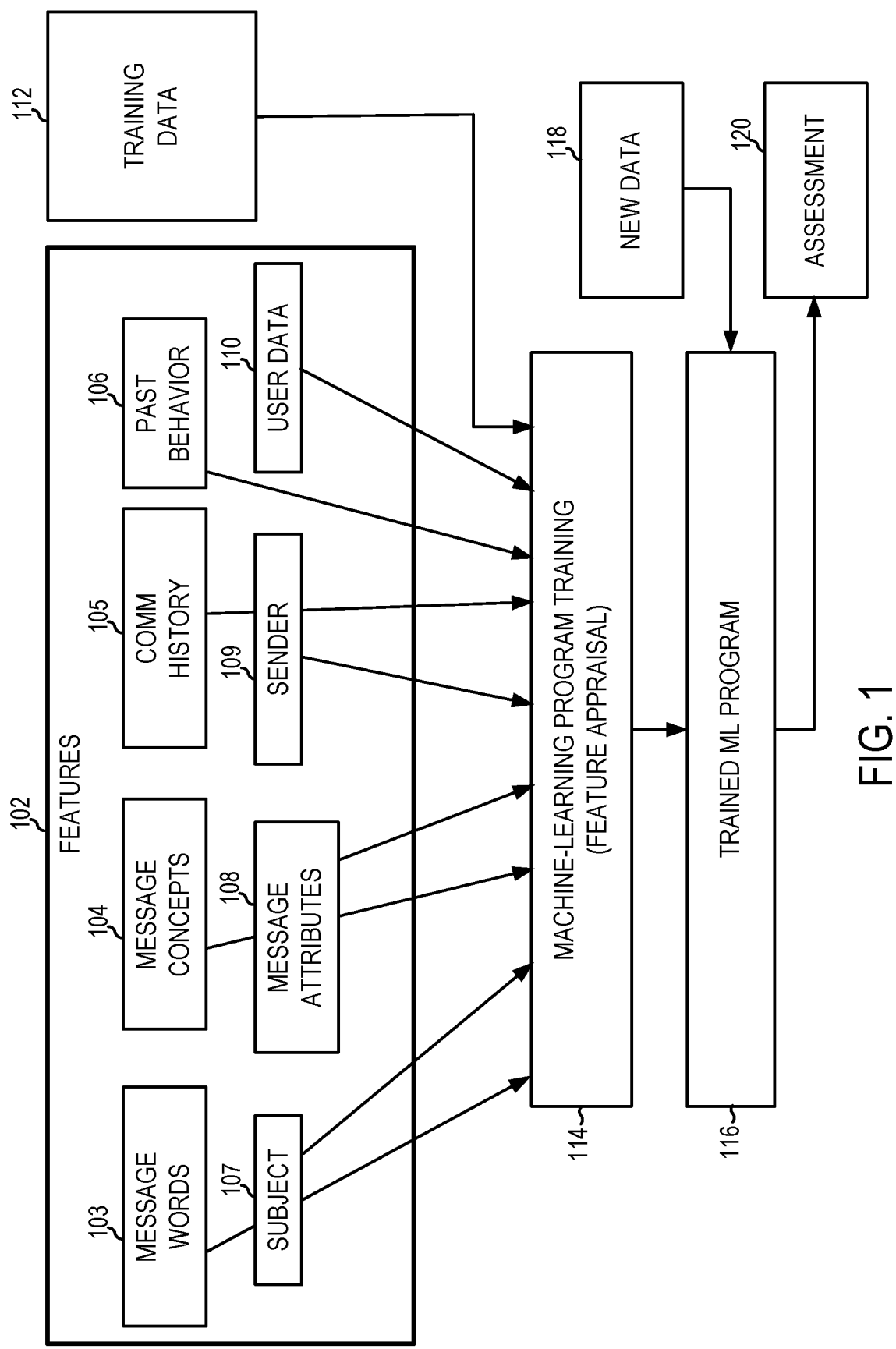
FIG. 1 illustrates the training and use of a machine-learning program, in accordance with some embodiments.

The present disclosure generally relates to machines configured to provide resource allocation and mission planning, including computerized variants of such special-purpose machines and improvements to such variants, and to the technologies by which such special-purpose machines become improved compared to other special-purpose machines that provide technology for pattern recognition algorithms (e.g., neural networks, statistical algorithms, and the like). In particular, the present disclosure addresses a computer architecture for resource allocation for course of action (COA) activities.

According to some aspects of the technology described herein, a resource allocation apparatus includes processing circuitry and memory. The processing circuitry receives, via a graphical user interface (GUI), an input comprising: (i) a representation of one or more tasks, each task comprising a task type, a feasible asset type, a desired time, and a geographic location, and (ii) a representation of one or more assets available for assignment, each asset being identified by an ID number, each asset having an asset type, one or more capabilities, and a current geographic location, wherein the GUI comprises a task input region for inputting the representation of the one or more tasks and an asset input region for inputting the representation of the one or more assets. The processing circuitry stores, in the memory, the representation of the one or more tasks and the representation of the one or more assets, wherein the representation of the one or more tasks is stored in a task data structure, wherein the representation of the one or more assets is stored in an asset data structure, wherein the task data structure comprises the task type, wherein the asset data structure comprises an indication of one or more of a payload, a weapon capability, a sensor capability, a speed capability, a range, and a fuel capacity. The processing circuitry initiates generation of a mission plan data structure comprising an assignment of an available asset to each task based on the asset type, the capabilities, and the current geographic location of each of the one or more assets and based on the task type, the feasible asset type, the desired time, and the geographic location of each of the one or more tasks, wherein the mission plan data structure comprises references to one or more task data structures and one or more asset data structures for one or more tasks and one or more assets involved in the mission plan data structure. Upon successfully generating the mission plan data structure, the processing circuitry provides an output comprising the mission plan data structure.

Other aspects include a method to perform the operations of the processing circuitry above, and a machine-readable medium storing instructions for the processing circuitry to perform the above operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, computing an efficient allocation of resources, for example in a military mission plan, may be challenging. Computer-implemented approaches for efficient resource allocation may be desirable.

According to some implementations, a computing machine receives, via a graphical user interface (GUI), an input comprising (i) a representation of one or more tasks and a representation of one or more assets. Each task comprises a task type, a feasible asset type, a desired time, and a geographic location. Each asset is identified by an ID number. Each asset has an asset type, one or more capabilities, and a current geographic location. The GUI comprises a task input region for inputting the representation of the one or more tasks and an asset input region for inputting the representation of the one or more assets. In some aspects, the task input region is the same as the asset input region. Alternatively, the task input region may be separate and distinct from the asset input region.

The computing machine stores, in its memory, the representation of the one or more tasks and the representation of the one or more assets. The representation of the one or more tasks is stored in a task data structure. The representation of the one or more assets is stored in an asset data structure. The task data structure comprises the task type. The asset data structure comprises an indication of one or more of a payload, a weapon capability, a sensor capability, a speed capability, a range, and a fuel capacity. The task data structure may include the data entered, via the GUI, into the task input region. The asset data structure may include the data entered, via the GUI, into the asset input region.

The computing machine initiates generation of a mission plan data structure comprising an assignment of an available asset to each task based on the asset type, the capabilities, and the current geographic location of each of the one or more assets and based on the task type, the feasible asset type, the desired time, and the geographic location of each of the one or more tasks. The mission plan data structure comprises references to one or more task data structures and one or more asset data structures for one or more tasks and one or more assets involved in the mission plan data structure. Upon successfully generating the mission plan data structure, the computing machine provides (e.g., for display via the GUI, for transmission, for storage in a data structure in a local or remote memory unit, and the like) an output comprising the mission plan data structure. The computing machine provides an indication that the mission plan data structure cannot be computed upon failing to generate the mission plan data structure.

As used herein, the term "computing machine" may include a single computing machine or multiple computing machines. A computing machine may include any device or combination of devices that includes processing circuitry and memory. The processing circuitry and the memory may reside in the same device or in different devices.

Throughout this document, some method(s) (e.g., in FIG. 6) are described as being implemented serially and in a given order. However, unless explicitly stated otherwise, the operations of the method(s) may be performed in any order. In some cases, two or more operations of the method(s) may be performed in parallel using any known parallel processing techniques. In some cases, some of the operation(s) may be skipped and/or replaced with other operations. Furthermore, skilled persons in the relevant art may recognize other operation(s) that may be performed in conjunction with the operation(s) of the method(s) disclosed herein.

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, the machine-learning program 116 may be asked to count the number of sedans and pickup trucks in a parking lot between 10:00 and 11:00. The machine-learning program 116 determines the required image quality to extract the information that is needed. The machine-learning program 116 determines if a target model exists for sedans and pickup trucks. The machine-learning program 116 locates images having the required image quality to extract the information that is needed. If such images do not exist for the given time and geographic location parameters, the machine-learning program 116 requests collection of such images for the given time and geographic location parameters. Upon receiving the requested or located images, the machine-learning program 116 pushes the images to the appropriate model.

Machine learning techniques train models to accurately make predictions on data fed into the models. During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

Figure 2:
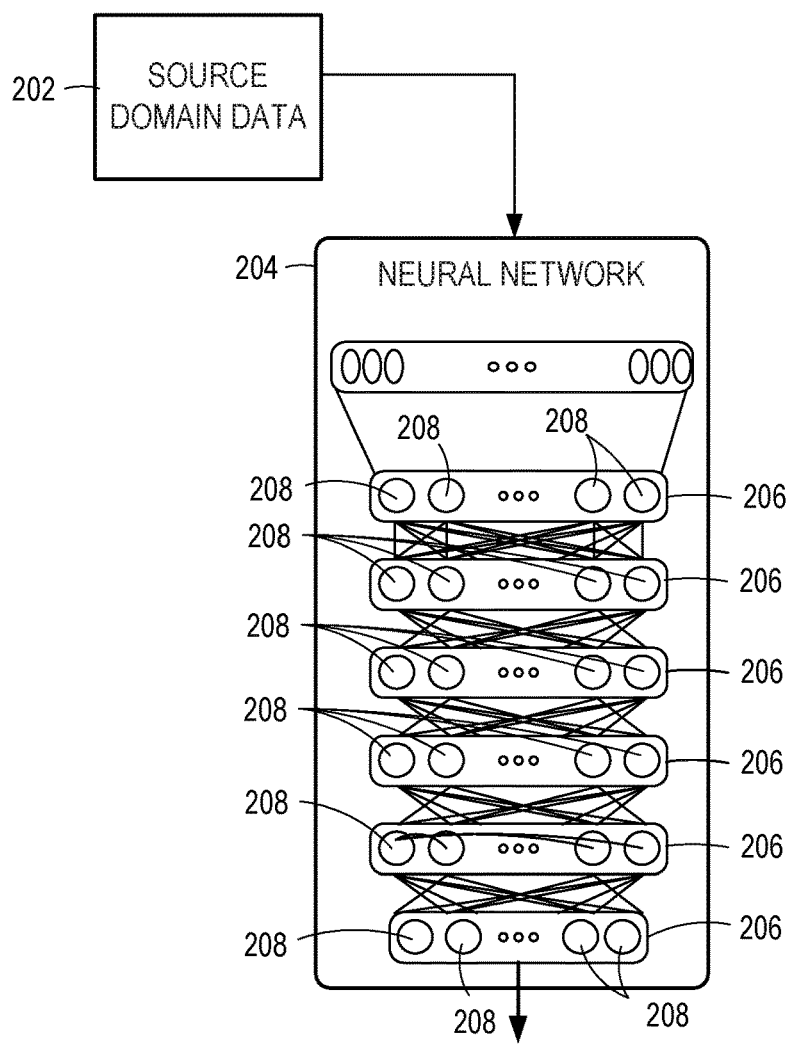
FIG. 2 illustrates an example neural network, in accordance with some embodiments.
Figure 2:
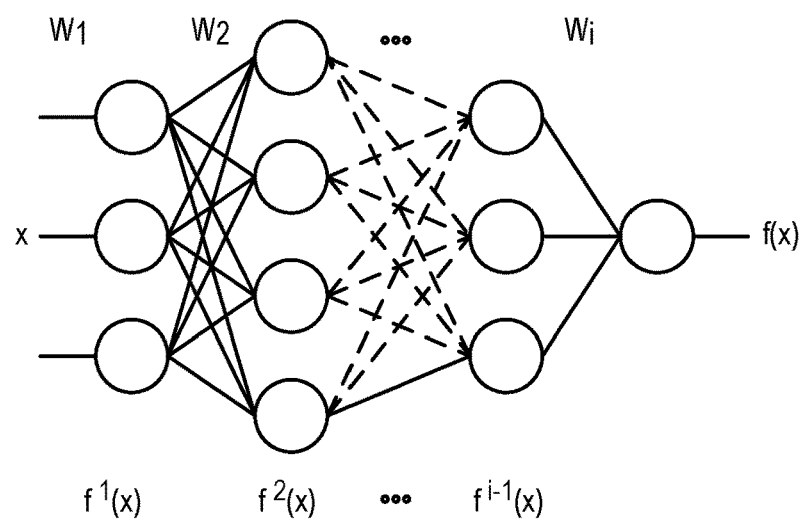

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1, W_2, \ldots, W_i$ are applied to the input to each layer to arrive at $f^1(x), f^2(x), \ldots, f^{i-1}(x)$, until finally the output f(x) is computed.

In some example embodiments, the neural network 204 (e.g., deep learning, deep convolutional, or recurrent neural network) comprises a series of neurons 208. A neuron 208 is an architectural element used in data processing and artificial intelligence, particularly machine learning on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized in various configurations of neural networks to provide interactions and relationship learning modeling for how each of the frames in an utterance are related to one another.

For example, a neural network node serving as a neuron includes several gates to handle input vectors (e.g., sections of an image), a memory cell, and an output vector (e.g., contextual representation). The input gate and output gate control the information flowing into and out of the memory cell, respectively. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., patterns in an image). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
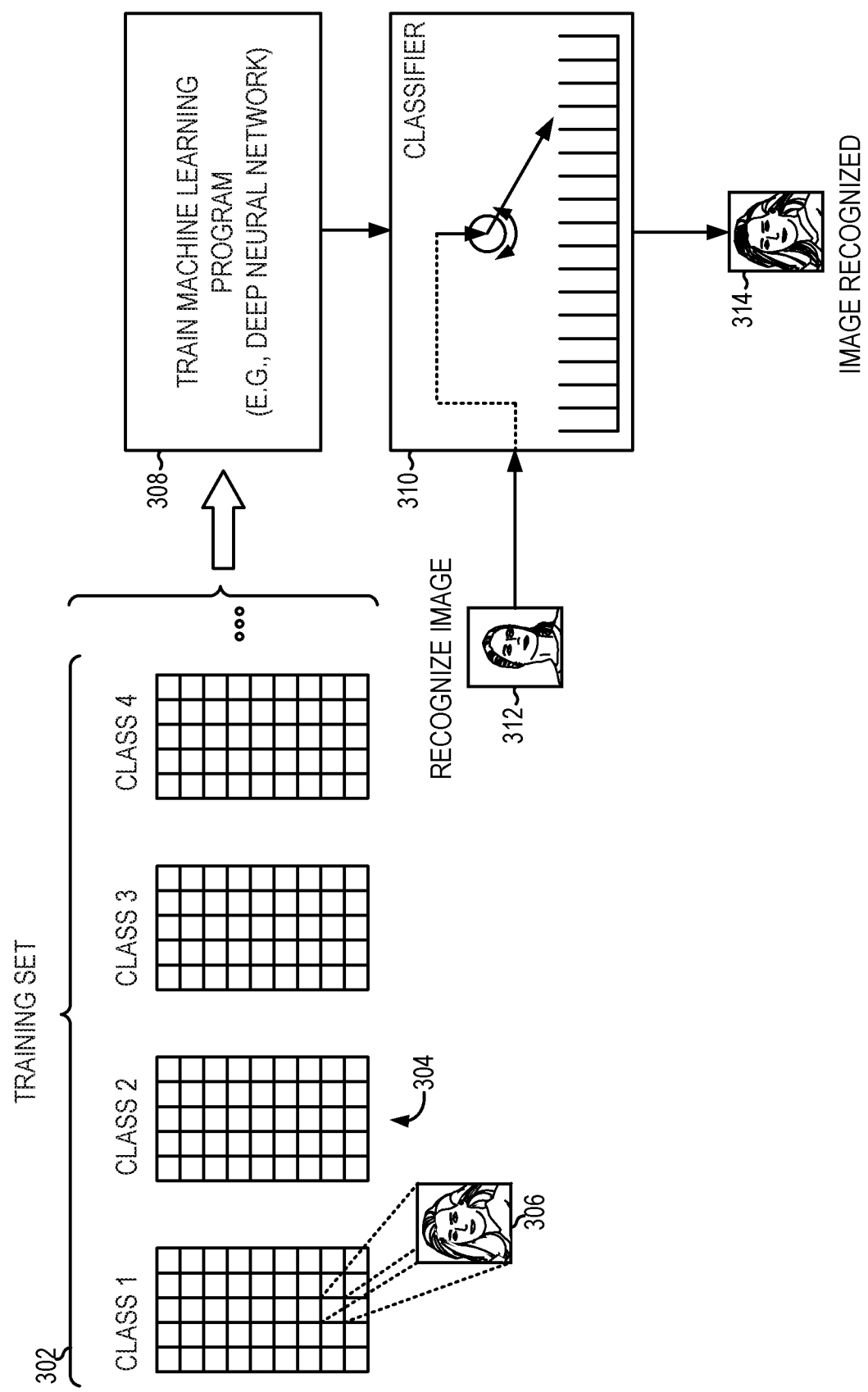
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
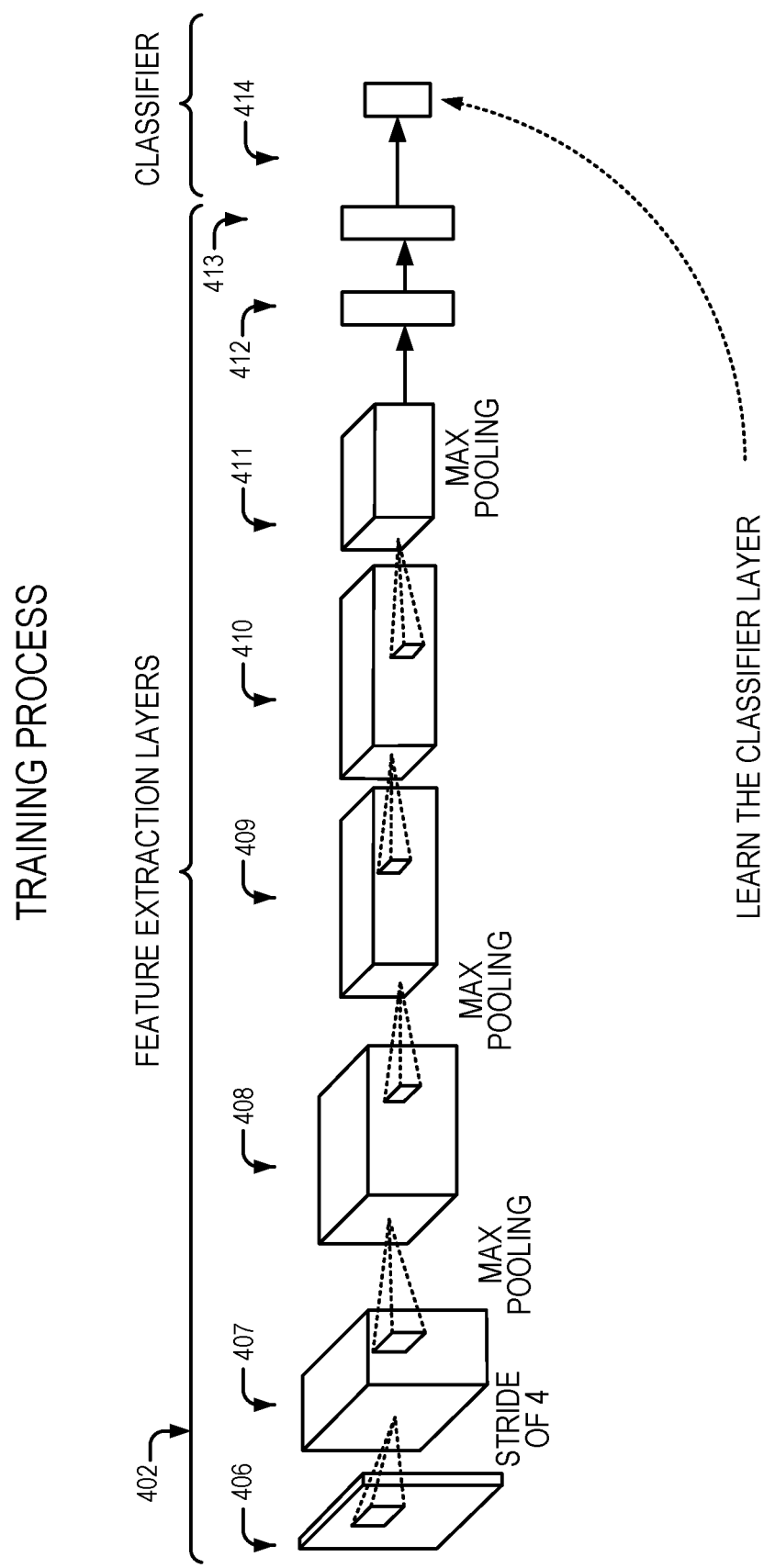
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

FIG. 4 is described in conjunction with a "stride of 4." However, it should be noted that any other positive integer stride value may be used. Also, FIG. 4 describes some but not all examples of stages of neural network processing. Some aspects of the technology disclosed herein may implement one or more of: convolution, skip connections, activation, batch normalization, dropout, and the predictive function. Skip connections include shortcuts to jump over some layers (e.g., layer m provides input directly to layer m+2). An activation is a minimum amount of input that causes an artificial neuron to "fire" an output. Batch normalization is a technique for training very deep neural networks that standardizes the inputs to a layer for each mini-batch. This has the effect of stabilizing the learning process and dramatically reducing the number of training epochs required to train deep networks. Dropout sets the output of some neurons to zero in order to prevent a neural network from overfitting. The idea of dropout is to randomly drop units (along with their connections) from the artificial neural network during training. This prevents the units from co-adapting too much.

Figure 5:
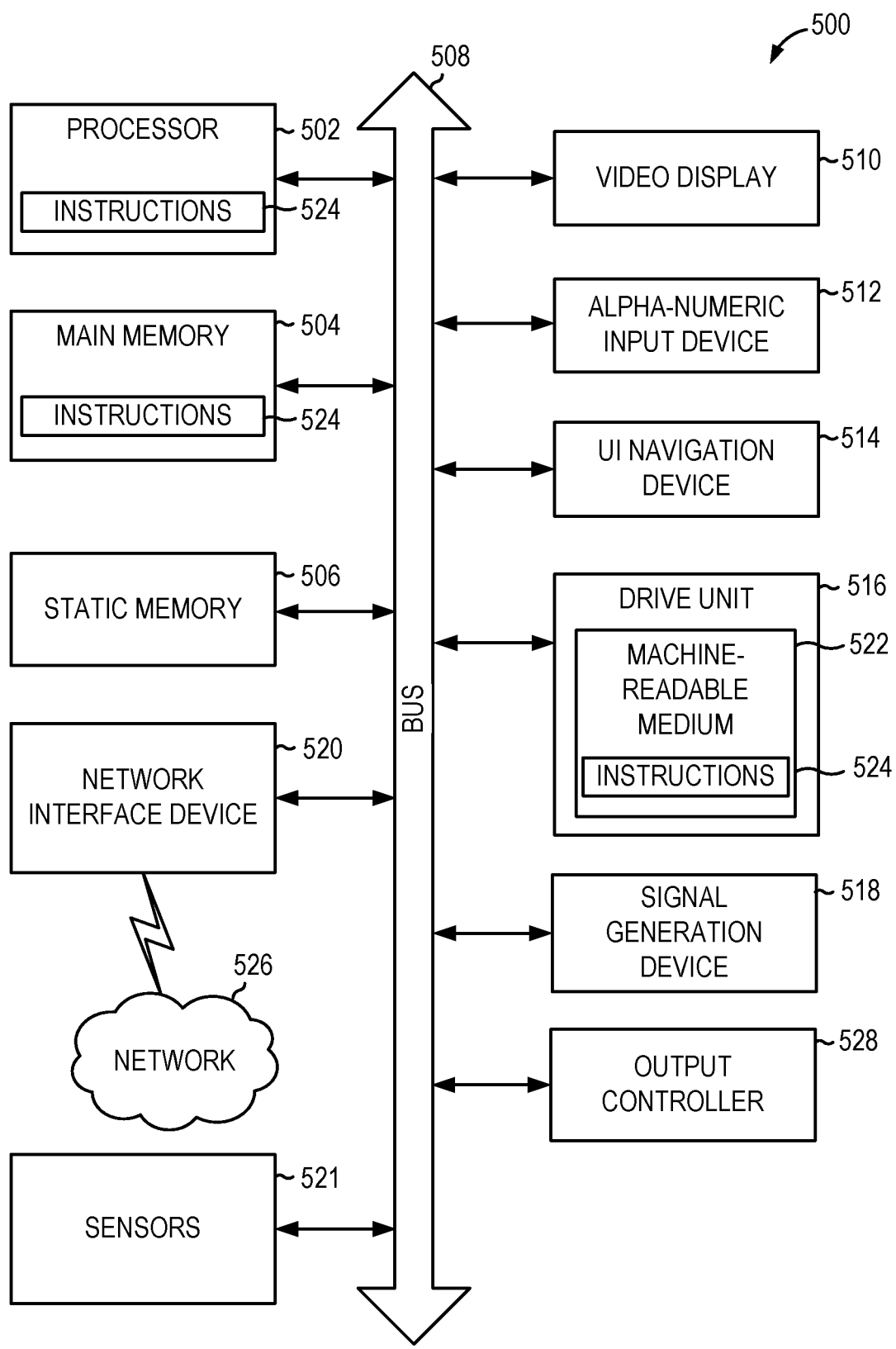
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

The technology disclosed herein uses various engines, each of which is constructed, programmed, configured, or otherwise adapted, to carry out a function or set of functions.

The term "engine" as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

Figure 6:
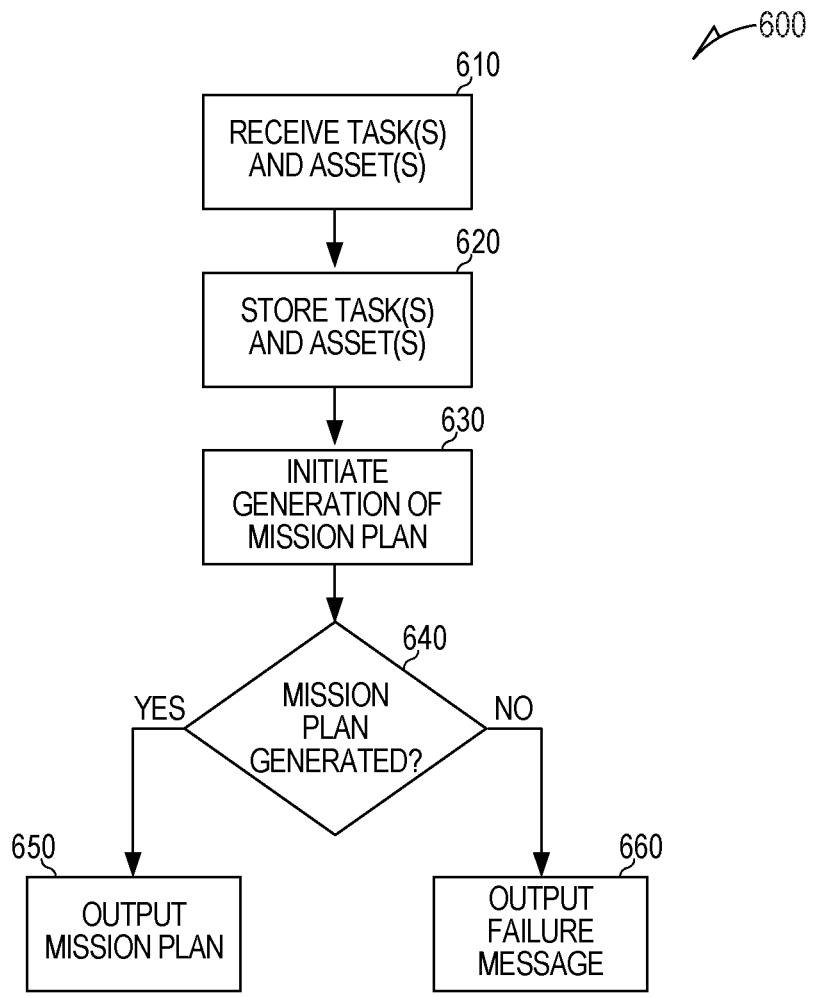
FIG. 6 is a flow chart of a method for resource allocation, in accordance with some embodiments.

FIG. 6 is a flow chart of a method 600 for resource allocation, in accordance with some embodiments.

Figure 7:
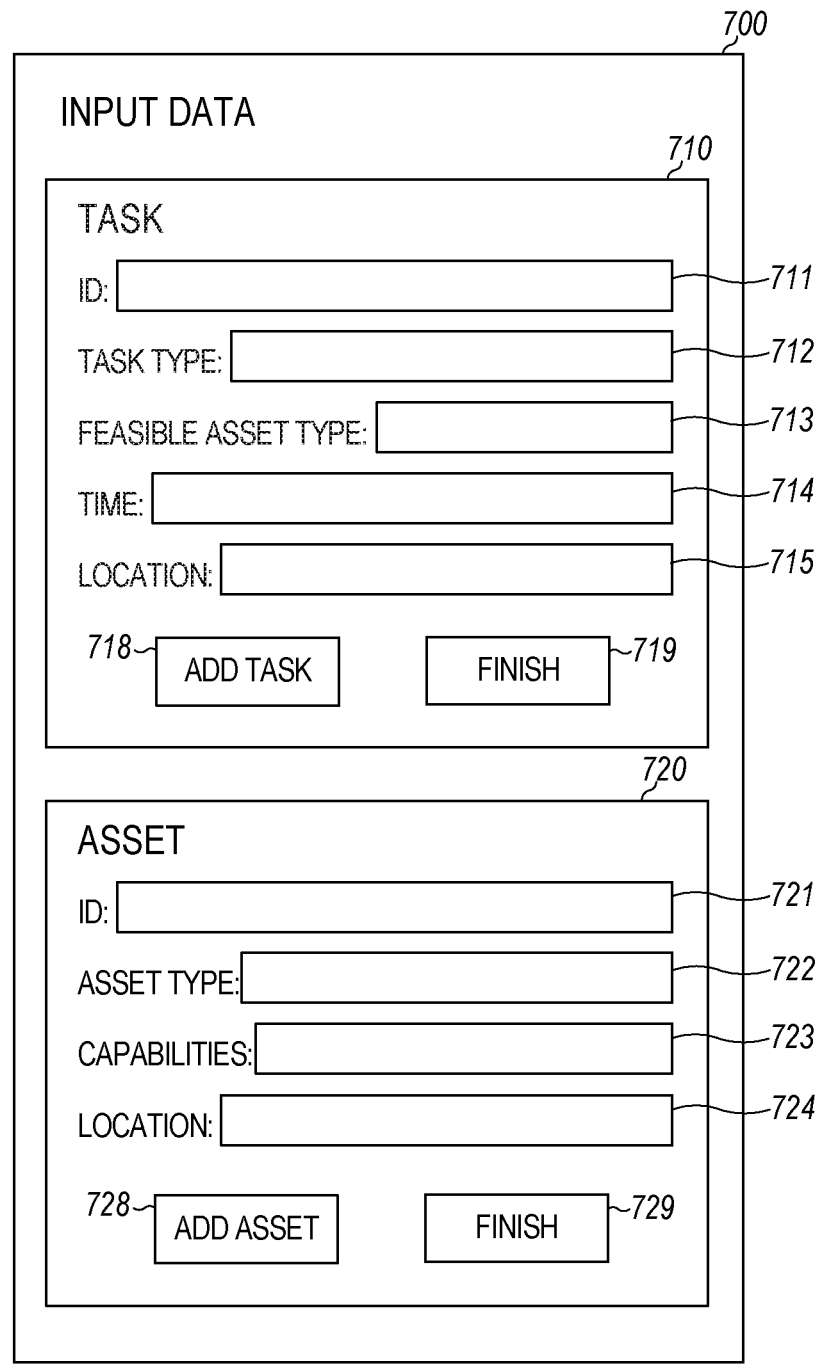
FIG. 7 illustrates an example graphical user interface (GUI) for providing input data for a resource allocation engine, in accordance with some embodiments.

At operation 610, a computing machine receives an input including task(s) and asset(s). The computing machine may receive the input via a graphical user interface (GUI) (e.g., as shown in FIG. 7 and discussed in detail below). Each task includes a task type, a feasible asset type, a desired time, and a geographic location. Each asset is identified by an ID number. Each asset has an asset type, one or more capabilities, and a current geographic location. The GUI includes a task input region for inputting the representation(s) of the task(s) and an asset input region for inputting the representation(s) of the asset(s). In some aspects, the task input region is the same as the asset input region. Alternatively, the task input region may be separate and distinct from the asset input region. The task(s) may be from one or more course of action (COA) activities.

The asset(s) may include one or more of: airplanes and manned and unmanned air, land, and sea based vehicles. The capabilities of the assets may include one or more of: a maximum speed, a maximum acceleration, a maximum travel distance, a weapon carrying capability, and an image capturing capability. The asset type for each asset may be, for example, one of: FireScout, Raven, GlobalHawk, F-15, and F-16 or another aerial, land, sea, space and/or cyber system that can be tasked to carry out an action (e.g., as part of a COA) in one or more relevant domains. The asset type for each asset may be, for example, a weaponized asset, an imagery asset, a sensing and detection asset or the like. The task type for each task may be one of: strike, SEAD (suppression of enemy air defenses), and PO (passive optical) data, imagery or video gathering, engage, and reconnaissance.

At operation 620, the computing machine stores, in a local or remote memory unit, the representation(s) of the task(s) and the representation(s) of the asset(s). The representation(s) of the task(s) are stored in task data structure(s). The representation(s) of the asset(s) are stored in asset data structure(s). The task data structure includes the task type. The asset data structure includes an indication of one or more of a payload, a weapon capability, a sensor capability, a speed capability, a range, and a fuel capacity. The task data structure may include the data entered, via the GUI, into the task input region. The asset data structure may include the data entered, via the GUI, into the asset input region.

At operation 630, the computing machine initiates generation of a mission plan data structure. The mission plan data structure includes an assignment of an available asset to each task based on the asset type, the capabilities, and the current geographic location of each of the asset(s) and based on the task type, the feasible asset type, the desired time, and the geographic location of each of the task(s). The mission plan data structure includes references to task data structure(s) and asset data structure(s) for the task(s) and the asset(s) that are involved in the mission plan (which is represented by the mission plan data structure). In some cases, a single asset from among the asset(s) is assigned to two or more tasks based on a capability of the single asset and based on a desired time and a geographic location of each and every one of the two or more tasks. In some cases, a single task may be assigned two or more assets, for example, multiple tanks may be involved in an attack. In some cases, the mission plan data structure may include a representation of timing of performance of the task(s) in the mission plan.

In some examples, initiating the generation of the mission data structure comprises simple path planning. Simple path planning comprises: computing a distance between a geographic location of an asset and a geographic location of one or more targets; generating paths to reach the one or more targets in different orders; and selecting a generated path having a shortest total distance travelled.

In some examples, initiating the generation of the mission data structure comprises genetic algorithm path planning. Genetic algorithm path planning comprises: computing a distance between a geographic location of an asset and a geographic location of one or more targets; generating paths to reach the one or more targets in different orders; and selecting a generated path meeting user-specified criteria. The user specified criteria comprises one or more of: avoiding a first predetermined geographic region, remaining within a second predetermined geographic region, avoiding static tracks, avoiding moving tracks, and maintaining a predetermined fuel or battery level of a first asset from among the asset(s).

In some examples, initiating the generation of the mission plan data structure comprises using asset state prediction. Asset state prediction comprises: leveraging an asset model for at least one asset including a plurality of parameters; and selecting a path for the at least one asset based on the asset model. The plurality of parameters include one or more of: a turn rate, a climb rate, a maximum speed, and a fuel capacity.

In some examples, initiating the generation of the mission plan data structure comprises verifying that a selected asset is able to return to a base location without running out of fuel or battery power.

In some examples, initiating the generation of the mission plan data structure comprises verifying that a selected asset has sufficient capabilities to perform an assigned task for which the selected asset is to be deployed.

In some examples, initiating the generation of the mission plan data structure comprises verifying that a given asset is not deployed to two different tasks at a same time.

In some examples, initiating the generation of the mission plan data structure comprises: the computing machine matching the asset type of each asset and the feasible asset type of each task to determine if a single asset could potentially be used for multiple tasks. The computing machine analyzes the geographic location of each task to determine if the single asset is capable of visiting multiple geographic locations. The computing machine analyzes the desired time of each task to determine if the single asset is capable of being at the geographic location of each task to which it is assigned at the desired time without idling for more than a threshold amount of time. The computing machine validates the mission plan data structure generated in the matching and the analyzing operations.

At operation 640, the computing machine determines whether a mission plan data structure that handles all of the input task(s) with the input available asset(s) was generated. If so, the method 600 continues to operation 650. If not, the method 600 continues to operation 660.

At operation 650, upon successfully generating the mission plan data structure, the computing machine provides (e.g., for display via the GUI, for transmission to another machine or system, for storage in a data structure in a local or remote memory unit, and the like) an output comprising the mission plan data structure. After operation 650, the method 600 ends.

At operation 660, upon failing to generate the mission plan data structure, the computing machine provides (e.g., for display via the GUI, for transmission, for storage in a data structure in a local or remote memory unit, and the like) an indication that the mission plan data structure cannot be computed. After operation 660, the method 600 ends.

FIG. 7 illustrates an example graphical user interface (GUI) 700 for providing input data for a resource allocation engine, in accordance with some embodiments. Alternative embodiments could use other GUI(s) or other interfaces for providing the input data.

As shown, the GUI 700 includes a task input region 710 and an asset input region 720. As illustrated in FIG. 7, the task input region 710 and the asset input region 720 are separate and distinct. In alternative embodiments, the task input region and the asset input region may be the same.

As shown, the task input region 710 includes an identifier (ID) input box 711, a task type input box 712, a feasible asset type input box 713, a time input box 714, and a location input box 715. The ID input box 711 is for inputting an ID number or ID string for the task. The task type input box 712 is for inputting a task type. The feasible asset type input box 713 is for inputting feasible asset type(s) (e.g., airplane, tank, and the like) for performing the task. The time input box 714 is for inputting time(s) for performing the task. The location input box 715 is for inputting a geographic location for performing the task.

As illustrated, the task input region 710 also includes an add task button 718 and a finish button 719. The add task button 718, when selected, causes the computing machine to create a task data structure based on data entered into the input boxes 711-715. The finish button 719, when selected, indicates, to the computing machine, that the user is finished inputting task(s).

As shown, the asset input region 720 includes an ID input box 721, an asset type input box 722, a capabilities input box 723, and a location input box 724. The ID input box 721 is for inputting an ID number or ID string for the asset. The asset type input box 722 is for inputting an asset type. The capabilities input box 723 is for inputting capabilities (e.g., weapon carrying, image taking, and the like) of the asset. The location input box 724 is for inputting a current geographic location of the asset. In some embodiments, the input data (e.g., tasks and/or available assets) may be entered by selecting, via the GUI, from various options (corresponding to each of the fields) displayed on the GUI.

As illustrated, the asset input region 720 also includes an add task button 728 and a finish button 729. The add task button 728, when selected, causes the computing machine to create an asset data structure based on data entered into the input boxes 721-724. The finish button 729, when selected, indicates, to the computing machine, that the user is finished inputting asset(s).

Figure 8:
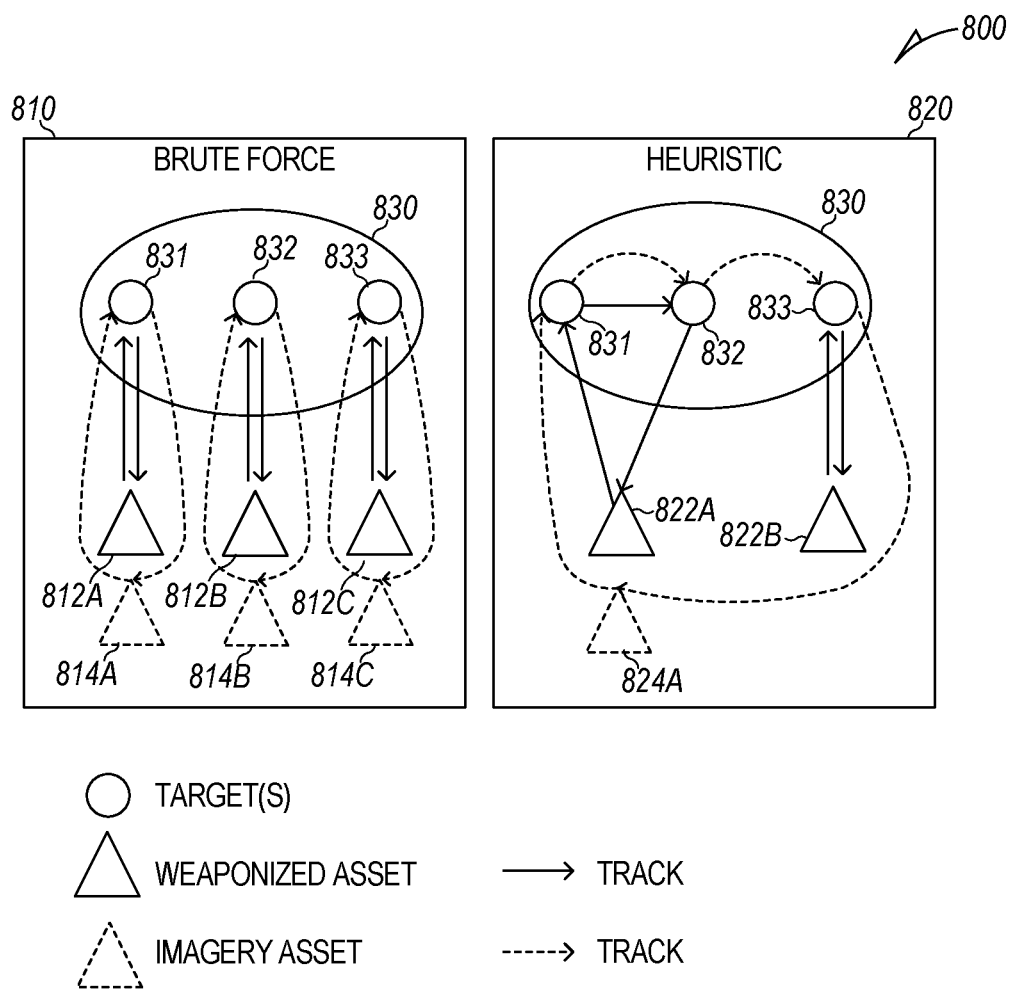
FIG. 8 is a graphic illustration of two example mission plans, in accordance with some embodiments.

FIG. 8 is a graphic illustration 800 of two example mission plans 810 and 820, in accordance with some embodiments. The two example mission plans include a brute force mission plan 810 and an optimized heuristic mission plan 820. As illustrated, both mission plans 810 and 820 involve tasks/actions (attacking and imaging) at three targets 831, 832, and 833 on an island 830.

The brute force mission plan 810 involves three weaponized assets 812A, 812B, and 812C, and three imagery assets 814A, 814B, and 814C. The target 831 is attacked by weaponized asset 812A and imaged by imagery asset 814A. The target 832 is attacked by weaponized asset 812B and imaged by imagery asset 814B. The target 833 is attacked by weaponized asset 812C and imaged by imagery asset 814C. Each asset 812A, 812B, 812C, 814A, 814B, and 814C is used for a single task and returns to its base after completing its task.

The heuristic mission plan 820 is optimized over the brute force mission plan 810 to leverage two weaponized assets 822A and 822B, and a single imagery asset 824A. As shown, according to the heuristic mission plan 820, the weaponized asset 822A attacks two targets 831 and 832 and then returns to its base. The weaponized asset 822B attacks target 833 and then returns to its base. The imagery asset 824A images three targets 831, 832, and 833 and then returns to its base. The heuristic mission plan 820 is more efficient than the brute force mission plan 810 because it uses fewer assets. In some examples, the heuristic mission plan 820 (or another mission plan optimized by heuristic(s) other than using the smallest number of assets) is the output of the method 600 of FIG. 6.

A Course of Action (COA) is a set of high level activities (e.g., Airstrike, BDA, and the like) that describe a potential solution for addressing a commander's intent (e.g., "gain superiority in this area"). Each activity in a COA may comprise one to N tasks (e.g., targets) and each task gets assigned to an asset which will execute a mission plan (e.g., flight route) to accomplish the task. One solution would be to create a mission plan for each task within an activity (e.g., Brute Force, 1 to 1). However, this may lead to unnecessary and excessive usage of resources.

Some aspects introduce a heuristic for resource allocation that aims to find the minimum number of mission plans and multi-domain assets required to provide completion of all COA activities while considering the unique or shared spatial, temporal, and textual attributes in the tasks. In some cases, heuristics find good solutions on large-size problem instances. Heuristics allow one to obtain acceptable performance at acceptable costs in a wide range of problems. In some cases, heuristics may not have an approximation guarantee on the obtained solutions. Heuristics may be tailored and designed to solve a specific problem and/or instance. One heuristic may aim to use the minimum number of assets possible. Other heuristics may minimize one or a predefined mathematical combination of the following: assets used, humans used, collateral damage, civilian injury, probability of failure, and the like.

The Vehicle Routing Problem (VRP) is a well-known NP-Hard problem that include different sub-problems regarding variants such as distance, time and cost. Some aspects implement the use of Constraint Propagation (CP) in addition to vehicle routing to determine the asset and route while ensuring a high (e.g., greater than a threshold, such as 0.9 or 0.99) probability of success taking into account the target.

In some embodiments, the input data may include a list of 1-N COA activities with 1-N tasks. Each task has a type (e.g., strike, SEAD, PO), a feasible asset type (e.g., FireScout), a desired date/time, and a location (e.g., latitude and longitude coordinates to strike or to image). The input data may include a list of available asset(s) for assignment to task(s) (e.g., FireScout, Raven, GlobalHawk, F-15, F-16). The output data may include a set of 1-N mission plans for 1-N tasks, with the ID number (e.g., tail number) of the asset(s) assigned for use to each task in the mission plan.

One example of a heuristic process is described below.

Operation 1: Go through each task within an activity and check for feasible asset type. If they are all the same, the minimum number of mission plans is at least 1, otherwise the minimum number of mission plans is at least the number of feasible asset types.

Operation 2: Examine the feasible asset type for each task, and determine if one asset could be used to fly between each of the targets in a "clear skies" scenario, or if the total distance to fly exceeds the limits of that asset type. If the distance is exceeded, there may be more than 1 mission plan for N tasks, so examine how many points can be reached by one asset and subtract those points from the set, and then loop until no additional points need to be reached. At this point, there may be either 1 mission plan still (1 feasible asset type, all points can be reached by one asset) or N mission plans (some combination of 1-N feasible asset types and 1-N assets required to reach all points).

Operation 3: Examine the date/time for each task, and determine if the dates/times are too close or far apart to only use one asset and one mission plan. For example, if the dates/times are more than 24 hours apart it might not make sense for a single asset to loiter up in the air for a full day before performing the next task. Also, if the dates/times were the same, it might indicate a redundancy built into the COA to try and get a higher probability of success, so multiple assets might need to be used to strike the same target or get the same picture. Assuming that there is 1 feasible asset type with N points that are reachable with unique but reasonable times, there could still be 1 mission plan, but likely there may be N mission plans (some combination of 1-N feasible asset types and 1-N assets required to reach all points).

Operation 4: At this point the heuristic is complete, but no usable mission plans have been created since a simple "clear skies/connect the dots" mission plan was used in the calculations above. To generate and validate the mission plans, some aspects use the techniques described herein. This will either come back with 1-N mission plans that can be flown by the specified assets, or information as to what needs to change. For example, perhaps 1 asset was used to try and strike 3 points, but there was a keep out area that had to be flown around which prevented the asset from reaching the last point. In such a case the last point may be assigned to a second asset, and the generation and validation process may be repeated.

Operation 5: Something to note is that error cases also need to be considered, in that the input data might lead to a result which says that there is no possible combination of assets and mission plans. One example would be that there is a COA activity with 3 strike tasks that each need their own asset because of temporal constraints, and there are only 2 assets of that type available for tasking. Another example would be when enough assets are available, but they are not located close enough to the mission area to reach the targets before exhausting their fuel/battery.

In summary, one example process includes: (1) analyze feasibility types, (2) analyze locations, (3) analyze dates and times, (4) generate and validate mission plans, (5) assign assets and check for errors, (6) repeat operations 1-5 until complete, and (7) send results.

Some aspects use spatial, temporal, and textual attributes to help determine the resource allocation. Some aspects use a path planner to validate results and enter a feedback loop to correct errors, if possible. Some aspects attempt to minimize the number of assets and plans, rather than assigning plans to a fixed number of assets. Some aspects work on multiple domains (e.g., air, sea, manned, unmanned, etc.).

Some aspects relate to a heuristic for resource allocation that aims to find the minimum number of mission plans and multi-domain assets to provide completion of all COA activities while considering the unique or shared spatial, temporal, and textual attributes in the tasks.

In some cases, the heuristic engine may rely on machine learning techniques (e.g., as described in conjunction with FIGS. 1-4). In some examples, the choice of asset is made based on asset characteristics, asset readiness, and asset feasibility. By utilizing machine learning, the heuristic engine may, in some cases, make smarter decisions and recommendations based on the information it accesses. This may be done by improving the heuristic engine to use deep learning by utilizing recurrent neural networks to improve the recognition and functionality of choosing the possible assets. In some embodiments, Principle Component Analysis (PCA) may be used to maximize the variance of the assets. The heuristic engine may utilize a decision tree algorithm to maximize a particular function (e.g., number of assets used). This may be done by minimizing the sum of a squared error between the predictive variable of the assets chosen that fall in the region and the ones assigned to it.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim.

Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A resource allocation apparatus, the apparatus comprising:
    processing circuitry and memory; the processing circuitry configured to:
    receive, via a graphical user interface (GUI), an input comprising: (i) a representation of one or more tasks, each task comprising a task type, a feasible asset type, a desired time, and a geographic location, and (ii) a representation of one or more assets available for assignment, each asset being identified by an ID number, each asset having an asset type, one or more capabilities, and a current geographic location, wherein the GUI comprises a task input region for inputting the representation of the one or more tasks and an asset input region for inputting the representation of the one or more assets;
    store, in the memory, the representation of the one or more tasks and the representation of the one or more assets, wherein the representation of the one or more tasks is stored in a task data structure, wherein the representation of the one or more assets is stored in an asset data structure, wherein the task data structure comprises the task type, wherein the asset data structure comprises an indication of one or more of a payload, a weapon capability, a sensor capability, a speed capability, a range, and a fuel capacity;
    initiate generation of a mission plan data structure comprising an assignment of an available asset to each task based on the asset type, the capabilities, and the current geographic location of each of the one or more assets and based on the task type, the feasible asset type, the desired time, and the geographic location of each of the one or more tasks; and
    upon successfully generating the mission plan data structure: provide an output comprising the mission plan data structure, wherein initiating the generation of the mission plan data structure data structure comprises genetic algorithm path planning, wherein the genetic algorithm path planning comprises:
        computing a distance between a geographic location of an asset and a geographic location of one or more targets;
        generating paths to reach the one or more targets in different orders; and
        selecting a generated path meeting user-specified criteria, the user specified criteria comprising one or more of: avoiding a first predetermined geographic region, remaining within a second predetermined geographic region, avoiding static tracks, avoiding moving tracks, and maintaining a predetermined fuel or battery level of a first asset from among the one or more assets.

2. The apparatus of claim 1, wherein the mission plan data structure comprises references to one or more task data structures and one or more asset data structures for one or more tasks and one or more assets involved in the mission plan data structure, and wherein the processing circuitry is further configured to provide an indication that the mission plan data structure cannot be computed upon failing to generate the mission plan data structure.

3. The apparatus of claim 1, wherein initiating the generation of the mission data structure comprises simple path planning, wherein the simple path planning comprises:
  computing a distance between a geographic location of an asset and a geographic location of one or more targets;
  generating paths to reach the one or more targets in different orders; and
  selecting a generated path having a shortest total distance travelled.

4. The apparatus of claim 1, wherein initiating the generation of the mission plan data structure comprises using asset state prediction, wherein the asset state prediction comprises:
  leveraging an asset model for at least one asset including a plurality of parameters, the plurality of parameters including one or more of: a turn rate, a climb rate, a maximum speed, and a fuel capacity; and
  selecting a path for the at least one asset based on the asset model.

5. The apparatus of claim 1, wherein initiating the generation of the mission plan data structure comprises:
  verifying that a selected asset is able to return to a base location without running out of fuel or battery power.

6. The apparatus of claim 1, wherein initiating the generation of the mission plan data structure comprises:
  verifying that a selected asset has sufficient capabilities to perform an assigned task for which the selected asset is to be deployed.

7. The apparatus of claim 1, wherein initiating the generation of the mission plan data structure comprises:
  verifying that a given asset is not deployed to two different tasks at a same time.

8. The apparatus of claim 1, wherein the one or more tasks are from one or more COA (course of action) activities.

9. The apparatus of claim 1, wherein initiating the generation of the mission plan data structure comprises:
  matching the asset type of each asset and the feasible asset type of each task to determine if a single asset could potentially be used for multiple tasks;
  analyzing the geographic location of each task to determine if the single asset is capable of visiting multiple geographic locations;
  analyzing the desired time of each task to determine if the single asset is capable of being at the geographic location of each task to which it is assigned at the desired time without idling for more than a threshold amount of time; and
  validating the mission plan data structure generated in the matching and the analyzing operations.

10. The apparatus of claim 1, wherein a single asset from among the one or more assets is assigned to two or more tasks based on a capability of the single asset and based on a desired time and a geographic location of each and every one of the two or more tasks.

11. The apparatus of claim 1, wherein the one or more assets comprise one or more of: airplanes and manned and unmanned air, land, and sea based vehicles, and wherein the one or more capabilities comprise one or more of: a maximum speed, a maximum acceleration, a maximum travel distance, a weapon carrying capability, and an image capturing capability.

12. The apparatus of claim 11, wherein the asset type for each asset is one of: FireScout, Raven, GlobalHawk, F-15, and F-16.

13. The apparatus of claim 11, wherein the asset type for each asset is one of: weaponized asset and imagery asset.

14. The apparatus of claim 1, wherein the task type for each task is one of: strike, SEAD (suppression of enemy air defenses), and PO (passive optical) data, imagery or video gathering, engage, and reconnaissance.

15. The apparatus of claim 1, wherein the mission plan data structure further comprises a representation of timing of performance of the one or more tasks.

16. A non-transitory machine-readable medium storing instructions which, when executed by processing circuitry of a machine, cause the processing circuitry to:
  receive, via a graphical user interface (GUI), an input comprising: (i) a representation of one or more tasks, each task comprising a task type, a feasible asset type, a desired time, and a geographic location, and (ii) a representation of one or more assets available for assignment, each asset being identified by an ID number, each asset having an asset type, one or more capabilities, and a current geographic location, wherein the GUI comprises a task input region for inputting the representation of the one or more tasks and an asset input region for inputting the representation of the one or more assets;
  store, in a memory of the machine, the representation of the one or more tasks and the representation of the one or more assets, wherein the representation of the one or more tasks is stored in a task data structure, wherein the representation of the one or more assets is stored in an asset data structure, wherein the task data structure comprises the task type, wherein the asset data structure comprises an indication of one or more of a payload, a weapon capability, a sensor capability, a speed capability, a range, and a fuel capacity;
  initiate generation of a mission plan data structure comprising an assignment of an available asset to each task based on the asset type, the capabilities, and the current geographic location of each of the one or more assets and based on the task type, the feasible asset type, the desired time, and the geographic location of each of the one or more tasks; and
  upon successfully generating the mission plan data structure: provide an output comprising the mission plan data structure, wherein initiating the generation of the mission plan data structure data structure comprises genetic algorithm path planning, wherein the genetic algorithm path planning comprises:
    computing a distance between a geographic location of an asset and a geographic location of one or more targets;
    generating paths to reach the one or more targets in different orders; and
    selecting a generated path meeting user-specified criteria, the user specified criteria comprising one or more of: avoiding a first predetermined geographic region, remaining within a second predetermined geographic region, avoiding static tracks, avoiding moving tracks, and maintaining a predetermined fuel or battery level of a first asset from among the one or more assets.

17. The machine-readable medium of claim 16, wherein the mission plan data structure comprises references to one or more task data structures and one or more asset data structures for one or more tasks and one or more assets involved in the mission plan data structure, and wherein the instructions, when executed by the processing circuitry, further cause the processing circuitry to provide an indication that the mission plan data structure cannot be computed upon failing to generate the mission plan data structure.

18. The machine-readable medium of claim 16, wherein initiating the generation of the mission data structure comprises simple path planning, wherein the simple path planning comprises:
   computing a distance between a geographic location of an asset and a geographic location of one or more targets;
   generating paths to reach the one or more targets in different orders; and
   selecting a generated path having a shortest total distance travelled.

19. A method comprising:
   receiving, via a graphical user interface (GUI), an input comprising: (i) a representation of one or more tasks, each task comprising a task type, a feasible asset type, a desired time, and a geographic location, and (ii) a representation of one or more assets available for assignment, each asset being identified by an ID number, each asset having an asset type, one or more capabilities, and a current geographic location, wherein the GUI comprises a task input region for inputting the representation of the one or more tasks and an asset input region for inputting the representation of the one or more assets;
   storing the representation of the one or more tasks and the representation of the one or more assets, wherein the representation of the one or more tasks is stored in a task data structure, wherein the representation of the one or more assets is stored in an asset data structure, wherein the task data structure comprises the task type, wherein the asset data structure comprises an indication of one or more of a payload, a weapon capability, a sensor capability, a speed capability, a range, and a fuel capacity;
   initiating generation of a mission plan data structure comprising an assignment of an available asset to each task based on the asset type, the capabilities, and the current geographic location of each of the one or more assets and based on the task type, the feasible asset type, the desired time, and the geographic location of each of the one or more tasks; and
   upon successfully generating the mission plan data structure: providing an output comprising the mission plan data structure, wherein initiating the generation of the mission plan data structure data structure comprises genetic algorithm path planning, wherein the genetic algorithm path planning comprises:
      computing a distance between a geographic location of an asset and a geographic location of one or more targets;
      generating paths to reach the one or more targets in different orders; and
      selecting a generated path meeting user-specified criteria, the user specified criteria comprising one or more of: avoiding a first predetermined geographic region, remaining within a second predetermined geographic region, avoiding static tracks, avoiding moving tracks, and maintaining a predetermined fuel or battery level of a first asset from among the one or more assets.

\* \* \* \* \*

UNITED STATES PATENT AND TRADEMARK OFFICE
CERTIFICATE OF CORRECTION

PATENT NO. : 10,877,634 B1  
APPLICATION NO. : 16/592528  
DATED : December 29, 2020  
INVENTOR(S) : Sica et al.

Page 1 of 1

It is certified that error appears in the above-identified patent and that said Letters Patent is hereby corrected as shown below:

In the Specification

In Column 5, Line 46, delete "nth" and insert --$n^{th}$-- therefor

In Column 6, Line 16, delete "f$^1$(x), f$^2$(x), . . . , f$^{-1}$(x)," and insert --$f^1(x), f^2(x), \ldots, f^{-1}(x),$-- therefor Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*